United States Patent [19]

Coe et al.

[11] Patent Number: 4,544,378

[45] **Date of Patent: * Oct. 1, 1985**

[54] NITROGEN ADSORPTION PROCESS

[75] Inventors: Charles G. Coe, Macungie; Steven M. Kuznicki, Allentown, both of Pa.

[73] Assignee: Air Products and Chemicals, Inc., Allentown, Pa.

[ * ] Notice: The portion of the term of this patent subsequent to Nov. 6, 2001 has been disclaimed.

[21] Appl. No.: 614,086

[22] Filed: May 24, 1984

Related U.S. Application Data

[63] Continuation-in-part of Ser. No. 441,822, Nov. 15, 1982, Pat. No. 4,481,018.

[51] Int. Cl.4 .............................................. B01D 53/04

[52] U.S. Cl. ............................................ 55/68; 55/75

[58] Field of Search ............... 55/68, 75, 389; 502/56, 502/68, 79, 85

[56] References Cited

U.S. PATENT DOCUMENTS

| | | | |
|---|---|---|---|
| 2,882,244 | 4/1959 | Milton | 252/455 |
| 3,140,932 | 7/1964 | McKee | 55/68 |
| 3,140,933 | 7/1964 | McKee | 55/68 |
| 3,313,091 | 4/1967 | Berlin | 55/58 |
| 3,375,065 | 3/1968 | McDaniel et al. | 502/79 X |
| 3,375,206 | 3/1968 | Shaw | 502/79 X |
| 3,449,265 | 6/1969 | Gladrow et al. | 502/68 |
| 3,513,108 | 5/1970 | Kerr | 502/79 |
| 3,597,169 | 8/1971 | Savage | 55/75 X |
| 3,647,682 | 3/1972 | Robo et al. | 502/79 X |
| 4,259,299 | 3/1981 | Hagiwara et al. | 55/75 X |
| 4,420,419 | 12/1983 | Ogawa et al. | 502/79 X |

FOREIGN PATENT DOCUMENTS 110478 12/1974 Fed. Rep. of Germany .

OTHER PUBLICATIONS

P. K. Basv et al., Molecular Sieve for Oxygen Enrichment of Air, Jul. 1982, vol. 1, pp. 35–40.

C. W. Roberts, Molecular Sieves for Industrial Separation and Adsorption Applications, Special Pub. #33, Chem. Soc. '80.

D. Atkinson & G. Curthoys–Journal of Chemical Education–"The Determination of Heat of Adsorption by Gas–Sold Chromatography", pp. 564–566.

A. U. Kiselev & Y. I. Yashin–"Gas–Adsorption Chromatography", 1969, pp. 120–125.

Chem. Soc. Faraday Transl., 1981–"Heats and Entropies of Adsorption of Saturated Hydrocarbon by Zeolites X and Y", by D. Atkinson & G. Curthoys, pp. 897–907.

Journal of Colloid and Interface Science, vol. 28, No. 2, 1968–R. J. Neddenreip–"Sodium Cation Adsorption Sites in Zeolite Types X and Y", pp. 293–304.

Z. Chem., vol. 15, No. 1, 1975, pp. 36–37–Translation–"Separating Ability of Zeolitic Molecular Sieves Toward Nitrogen/Oxygen Mixtures", E. Wolfe et al.

J. B. Uytterhoeven et al.–"Studies of the Hydrogen Held by Solids XVI Infrared Spectroscopy of X–and Y–Type Zeolites Containing Univalent and Divalent Cations", pp. 425–434.

(List continued on next page.)

*Primary Examiner*—Robert H. Spitzer

*Attorney, Agent, or Firm*—Richard A. Dannells, Jr.; James C. Simmons; E. Eugene Innis

[57] ABSTRACT

The invention relates to a process for adsorption of nitrogen from nitrogen-containing gases using faujasite-containing compositions in which the original hydrogen or monovalent forms are ion exchanged to their polyvalent form and then dehydrated in such a manner as to result in a preponderence of its polyvalent ions in a dehydrated/dehydroxylated state while maintaining substantially the same zeolite content. The resulting compositions, whose cations contained in the faujasitic portion are substantially in their dehydrated/dehydroxylated state, have been found to have surprisingly high selectivities and capacities for the separation of air into nitrogen and oxygen.

10 Claims, 5 Drawing Figures

OTHER PUBLICATIONS

Izi Akad, Nauk Gruz, SSR, Ser. Kim., vol. 1, No. 4, pp. 399–402, 1975–T. G. Andronikashuili et al., "Chromatographic Separation of a Mixture of Oxygen and Nitrogen on Cation–Modified Synthetic Mordenites–"Translation.

Special Pub. No. 33–The Properties and Applications of Zeolites–pp. 92–102.

The Journal of Physical Chemistry–vol. 72, No. 4, 1968–"X–Ray Evidence for Residual Water in Calcined Divalent Cation Faujasite–Type Zeolites", pp. 1400–1401, D. H. Olsen.

Res. Bull., vol. 3, pp. 633–642–J. M. Bennett et al.–1968–"Positions of Cations and Molecules in Zeolites with the Faujasite–Type Framework".

J. W. Ward–A Spectroscopic Study of the Surface of Zeolite Y–vol. 72, No. 12–1968–"II Infrared Spectra of Structural Hydroxyl Groups and Adsorbed Water on Alkali, Alkaline Earth, and Rare Earth Ion–Exchange Zeolites"–pp. 4211–4223.

Journal of Catalysis 10, pp. 34–46–1968–J. W. Ward–"-The Nature of Active Sites on Zeolites III. The Alkali and Alkaline Earth Ion–Exchangen Forms".

Canadian Journal of Chemistry, vol. 42–1964–H. W. Habgood–"Adsorptive and Gas Chromatographic Properties of Various Cationic Forms of Zeolite X'"–pp. 2340–2350.

"Adsorption By Dehydrated Zeolite Crystals", Chapter 8, pp. 593–724, D. W. Breck.

Earth Science and Astronomy–pp. 215–220–H. Minato et al.–"Adsorpton of $CO_2$ and $N_2$ Gases on Some Natural Zeolites and Their Ion–Exchanged Forms"–H. Minato et al.

A.I.Ch. E. Journal–A. L. Myers et al., pp. 121–127–"-Thermodynamics of Mixed–Gas Adsorption".

Chemistry and Industry–1967–p. 829–K. S. W. Sing–'-'Assessment of Microporosity".

Journal of Colloid and Interface Science 21, pp. 405–414–1966–J. H. de Boer et al., "Thet–Curve of Multimolecular $N_2$–Adsorption".

Vol. II–Preparation and Examination of Practical Catalysts–pp. 7–13–"Experimental Methods in Catalytic Research", A. P. Bolton.

R. M. Barrer & W. I. Stuart, "Ion Exchange and the Thermodynamics of Intracrystalline Sorption", Jun. 21, 1958, pp. 464–483, I. Energetics of Occlusion of Argon and Nitrogen by Faujasite–Type–Crystals.

Donald Peterson, "Influence of Presorbed Water on the Sorption of Nitrogen by Zeolites at Ambient Temperatures", Zeolites, 1981, vol. 1, Jul., pp. 105–112.

J. A. Rabo, C. L. Angell, P H. Kasai & Verner Schomaker–"Studies of Cations in Zeolites": Adsorption of Carbon Monoxide; Formation of Ni Ions and $Na^{3+}$ Centres, Union Carbide Research Institute, N.Y., pp. 328–349.

EFFECT OF CaX LOADING ON GC SELECTIVITY FOR $N_2/O_2$ $N_2$ ISOTHERMS AT 30° C

LEGEND

| INITIAL DRYING | CURVE | EXAMPLES | CONTROLS |
| --- | --- | --- | --- |
| □ AMBIENT TEMPERATURE | A | 27 | — |
| # 100 - 120°C UNDER $N_2$ PURGE | A | 28 | — |
| △ | A | 28 | — |
| ✱ PROGRESSIVELY TO 300°C UNDER 50 mm Hg | B | 29 | — |
| ◇ "B" ACTIVATED AT 40°C/MIN. IN GC COLUMN | C | — | 29 |
| + 250°C IN OVEN FOR 2 HRS. | C' | — | 31 |
| o 225°C UNDER $N_2$ PURGE | D | — | 30 |

NITROGEN ISOTHERMS FOR CaX
MILLIMOLES/GM
0.0
0.1
0.2
0.3
0.4
0.5
0.6
0.7
0.8
0
100
200
300
400
500
600
700
800
900
1000
TORR
ACTIVATION CONDITIONS
EXAMPLES/CONTROLS
□ 400°C UNDER $10^{-5}$ mm Hg 30 —
◇ 400°C UNDER $N_2$ FLOW (DP<−35°C) 31 —
✱ 300°C UNDER $N_2$ FLOW (DP <−35°C) — 32

EFFECT OF DRYING TEMPERATURE ON ZEOLITE CONTENT AND NITROGEN CAPACITY

| ZEOLITE CONTENT[a] | NITROGEN CAPACITY[b] | CATION |
|---|---|---|
| △ | ⬡ | Na |
| ○ | □ | Ca |

a) OXYGEN ADSORBTION AT -196°C, 20 TORR b) AT 30°C, 1 ATM.

DEPENDENCE OF CA INDEX ON THE STATE OF FAUJASITIC ADSORBENTS

NITROGEN ADSORPTION PROCESS

CROSS-REFERENCE TO RELATED APPLICATION

This application is a continuation-in-part of Ser. No. 441,822, filed Nov. 15, 1982, now U.S. Pat. No. 4,481,018, issued Nov. 6, 1984.

TECHNICAL FIELD

This invention relates to a process for using novel faujasite-containing compositions. More particularly, the invention is directed to a process using faugasite-containing zeolites which exhibit superior properties for the selective adsorption of nitrogen and which therefore provide superior utility in the separation of air into nitrogen and oxygen.

BACKGROUND OF THE PRIOR ART

Mlecular sieve zeolites have long been observed to demonstrate selective adsorption when in contact with a variety of adsorbable mixtures. This attribute may be utilized to affect a variety of separations, as for example, the separation of n-paraffins from branched chain paraffins or other well known separations using pressure swing or vacuum swing processes. The adsorptive selectivity of the zeolite towards one or more components of a mixture must be maximized to maximize the efficiency of the desired separation. Assuming all other engineering factors remain constant, the adsorption characteristics of the material selected for the separation process influences both the production level and the purity of the gases produced.

The phenomenon of selective adsorption by molecular sieve zeolites may arise from one of two properties inherent to these crystalline materials. The property of molecular sieving may arise from the extremely uniform porosity demonstrated by these crystalline aluminosilicates. The size or shape of one or more components of a mixture may preclude its adsorption by the materials. The separation of n-paraffins from branched chain paraffins is an example of this effect. If a zeolite with a pore opening of ~5A is employed, the n-paraffin component of a mixture is readily adsorbed, but branched chain paraffins are excluded from adsorption by virtue of their configuration, effecting a separation of the components which is the basis of several commercial processes. If, however, the molecules of the mixture to be separated are all small enough to enter the zeolite crystals, selective adsorption may none the less be demonstrated by a second mechanism. Zeolites have large quantities of exchangeable cations present within their aluminosilicate framework. These cations are situated such that a high proportion may come into contact with adsorbates small enough to enter the crystalline zeolite framework. The energetic interaction of these cations with polar or polarizable adsorbates results in these adsorbates being selectively adsorbed from a mixture of less polar or polarizable species. This effect allows such separations as the selective adsorption of $N_2$ from air as demonstrated by calcium exchanged A-type zeolite and sodium mordenite by pressure swing or vacuum swing adsorption processes. A comprehensive summary of the adsorptive properties of prior art molecular sieve zeolites, their causes and uses is found in D. W. Breck, Zeolite Molecular Sieves, J. Wiley and Sons, New Yor, Chapter 8, pages 593–724 (1974).

Nitrogen has a quadrupole of 0.31 $Å^3$ and therefore may energetically interact more strongly with the aforementioned cations when $O_2$, with its quadrupole of only 0.10 $Å^3$. Thermodynamics dictates that the more strongly adsorbed species will be preferentially adsorbed. Further, this cation to $N_2$ interaction energy, and concomitantly the adsorptive preference or selectivity, may be altered with the choice of exchangeable cations present. In general, in a given zeolite the interaction energy and thus the capacity for nitrogen rises with the charge density of the cation. Thus, it has been found in the literature, Breck, Od. Cit., pages 694–695 and H. Minator and M. Watanabe, Scientific Paper General Education, University of Tokyo, Volume 28, page 218 (1978), that for the monovalent alkali metal cations the following trend of nitrogen capacity exists: $Li+->Na+>K+>Rb+>Cs+$. Oxygen, with its smaller quadrupole and concomitantly smaller cation-quadrupole interaction energy, is much less sensitive to the cation present. $N_2/O_2$ selectivities follow the same trend as $N_2$ capacities. One would expect that the polyvalent cations would follow a similar trend and due to their high charge density would be even more useful in the separation of nitrogen and oxygen. However, this characteristic has not been clearly demonstrated for any zeolite. In fact, it has been reported that in the faujasite type, e.g., zeolite X, the reverse trend exists as described in U.S. Pat. Nos. 3,140,932 and 3,140,933.

Water, being quite polar, is strongly bound to the aforementioned cations. It has long been recognized that these materials must be activated or dehydrated at elevated temperatures to remove wter or other polar substances, which would block adsorption of such species as $N_2$. Dehydration of zeolitic adsorbents for gas adsorption generally means that the residual water content in the adsorbent is less than 1.5% by weight water; see Peterson, Zeolites, Vol. 1, pages 105–112 (1981). However, previous zeolite surface scientists in the field of air separation and gas adsorption have completely failed to recognize the sensitivity of the adsorption characteristics of polyvalent-exchanged zeolites in general and calcium-exchanged faujasites in the specific, to thermal activation procedures; see U.S. Pat. Nos. 2,882,224, 3,140,932, and 3,313,091. A good example of this lack of recognition is found in Milton, 2,882,244 which discloses and claims zeolite X adsorbents. It is stated at column 15, lines 23–31 of ths patent that zeolite X may be activated by heating in air, vacuum or other appropriate gases at temperatures as high as about 700° C., at which conditions other adsorbents have been found to be partially or completely destroyed. In fact, a well recognized procedure in the manufacture of such zeolites is to follow the synthesis and/or ion exchange step with a drying step at temperatures of up to about 250° C.

It has not been recognized previously and it has now been found through the use of zeolite content determinations, adsorption measurements, gas chromatographic analyses, and infrared studies which are presented in part in the Examples below, that both cation and framework hydrolysis can give rise to reduced nitrogen capacities and selectivities for the calcium-exchanged X faujasite if the thermal history of the material is not carefully controlled after the ion exchange step has taken place. From these comparisons, it becomes evident that a significant difference in the stability exists between the monovalent and the polyvalent forms of faujasites. The sodium form of faujasite, a common adsorbent used in drying operations, is routinely dried at temperatures of 250° C. without any evidence of a decreased performance as an adsorbent. When one subjects the calcium form of faujasite to the same drying conditions, the resulting adsorbent properties can be inferior to the sodium, but are generally comparable to the sodium form. It is believed that the calcium form of faujasite has been overlooked as an adsorbent for air separation because it was thought not to offer any particular advantage over the sodium form. In fact, out of all of the zeolitic prior art, only one reference suggests that the calcium form has even a slight advantage over the sodium form of faujasite; see Habgood, H. W., Canadian Journal of Chemistry, Vol. 42, pages 2340–2350 (1964). It was found that when what is believed to be the Habgood heat treatment procedures were followed for preparing the X-type zeolites including a highly exchanged calcium form, e.g., greater than 90%, the nitrogen capacity extrapolated to 30° C. and atmospheric pressure was significantly lower than the capacity of the same highly calcium exchanged X-type of zeolite which was prepared under the carefully controlled thermal activation conditions to produce compositions useful in the process of the present invention. Although the specific drying and thermal activation conditions are not set forth in the Habgood reference, it is apparent that the thermal history of his zeolite has not been carefully controlled because of the significantly lower estimated nitrogen capacity and the corrected selectivity values as set forth in detail in the Examples below.

Other references which either have reported gas chromatographic selectivities and/or nitrogen capacities which are significantly lower than those obtained by the absorbent compositions used in the process of the present invention or have disclosed calcium exchanged zeolites without any suggestion as to their having any utility as adsorbents linclude Wolfe, E., et al., German Patent No. 110,478 (1974); Wolfe, F., et al., Z. Chem., Vol. 15, pages 36–37 (1975); Andronikasuili, T. G., et al., Izv. Akad. Nauk. Grvz. U.S.S.R., Ser. Khim., Vol. 1, No. 4, pages 339–402 (1975); Uytterhoeven, J. B., Schoonheydt, R., Liengme, B. V., and Hall, W. K., Journal of Catalytis 13, 425–434 (1969); Ward, J. W., Journal of Catalysis 10, 34–46 (1968); Ward, J. W., Journal of Physical Chemistry 72, 4211 (1968); Olson, D. H., Journal of Physical Chemistry 72, L400-01 (1968); Bennett, J. M. and Smith J. V., Mat. Res. Bull. Vol. 3, 633–642 (1968); Rabo, J., C. Angell, P. Kasai and V. Schomaker, Faraday Society Discussions, Vol. 41, 32 (1965) and Barrer, R. M. and Stuart, W. I., Proceedings of the Royal Society (London) A249, 464–483 (1959).

SUMMARY OF THE INVENTION

In a significant departure from the teachings of the prior art, a method of activation has been discovered whereby certain polyvalent exchanged aluminosilicate zeolites, especially those having silicon to aluminum ratios of approximately 1 and up to about 2 can be converted into novel highly selective adsorbents for nitrogen. It is believed that minimizing the amount of water present during the thermal activation of such materials results in both the substantial retention of accessible zeolite content and production of a preponderance of polyvalent cations in a dehydrated/dehydroxylated state. It has been discovered that the adsorbent compositions used in the process of the present invention have substantially greater selectivities for the separation of a binary mixture of nitrogen and oxygen and higher nitrogen capacities than empirically similar materials prepared by the teachings of the prior art. This phenomenon is particularly true for compositions containing a major portion of an aluminosilicate in which the silicon to aluminum ratio is from about 1 to 2, i.e. the X-type faujasites.

An analytical indicator, hich has been termed Cation Availability (CA) Index, has been developed for indicating when the adsorbent has a preponderance of its polyvalent cations in a dehydrated/dehydroxylated state. This indicator allows a definition of this class of faujasitic adsorbents irrespective of how they were prepared and activated.

In summary, the present invention is directed to an improvement in a process for the adsorption of nitrogen from a mixture of gases containing nitrogen. The improvement comprises contacting the nitrogen-containing gases with a polyvalent cation exchanged zeolite adsorbent containing at least 50% by weight faujasite with the faujasite portion having a majority of its exchangeable cations in the polyvalent cation exchanged form, in which the adsorbent has been dehydrated in such a manner as to result in a preponderance of its polyvalent cations in a dehydrated/dehydroxylated state.

Such a dehydration of the adsorbent can be accomplished in a thermal activation step by a number of different methods in which the zeolitic water and the hydration spheres are carefully removed and the amount of water in the gaseous environment in contact with the zeolite during this step is minimized; i.e., the partial pressure of water making such contact should be less than about 0.4 atm., preferably no more than about 0.1 atm.

One method of accomplishing this is to subject the polyvalent exchanged composition which contains up to about 30% by weight of water to pressures in the range of about 0.1 to 10 atmospheres while maintaining sufficient molar mass velocities and residence times of a flow of a non-reactive purge gas; i.e., a molar mass velocity (G) of about 0.5 to 100 kg. mole/m$^3$-hr. (=0.1 to 20 lbs.-mole/ft.$^2$-hr.) and a residence time (r) of no greater than about 2.5 minutes, heat said composition at a temperature ramp of 0.1° to 40° C./min. up to temperatures of at least above 300° C. and no greater than 650° C., and maintain the composition at these temperatures for a period of at least about 12 hours. The residence time is defined as the volume of the column or other unit used to thermally activate the zeolite divided by the volumetric flow rate of the purge gas at the standard temperature and pressure (STP). The molar mass velocity is simply the flow rate of the purge gas divided by the cross-sectional area of the column used for thermal activation. The purpose of the purge gas is to provide a sufficient mass for efficient heat and mass transfer from the surface of the adsorbent at a residence time to limit the water in the purge gas exiting the adsorbent bed to the desired low limits. The minimum residence time is determined by economic and process constraints, although times of less than 0.0025 minutes would appear to provide no advantages.

Another method of thermal activation is to conduct it under less than about 0.1 atmosphere vacuum without the use of a purge gas and to heat the material to the desired activation temperature at a temperature ramp from 0.1° to 40° C./min.

Still another method that is available for thermal activation of the zeolitic adsorbents of this invention is the use of microwave radiation at conditions that are described in U.S. Pat. No. 4,322,394, of which the description of the microwave procedure for thermally activating zeolites is incorporated herein by reference.

Any of the above methods of activation can be employed so long as the zeolite content as determined by adsorptive methods in the activated composition is maintained at at least about 70% of its initial value prior to the thermal activation step.

DETAILED DESCRIPTION OF THE INVENTION

Figure 1:
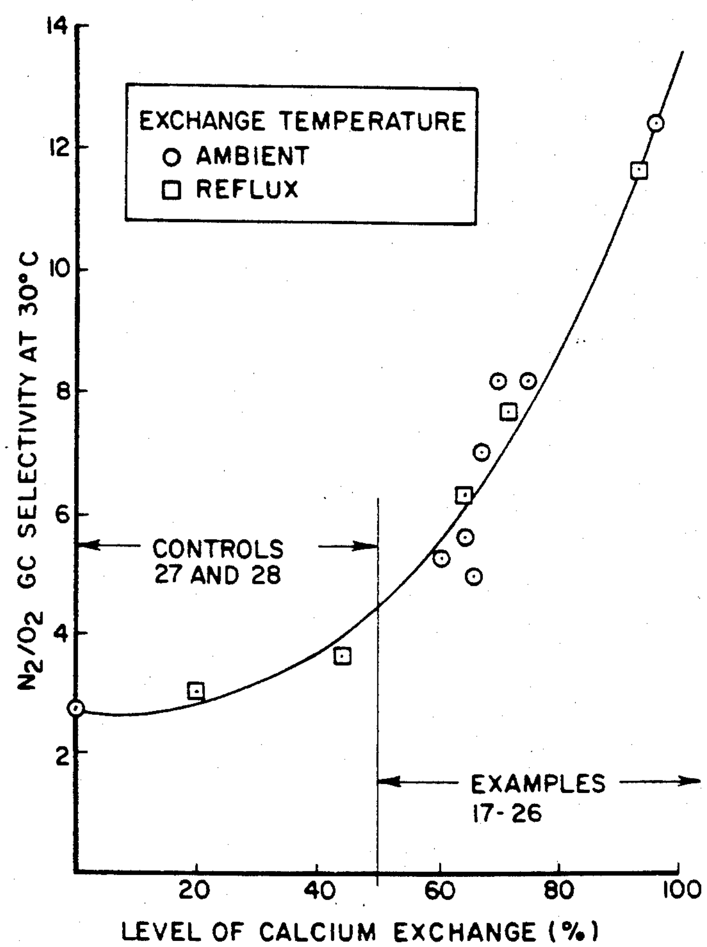
FIG. 1 is a plot of the data showing the effect the ion exchange loading has on gas chromatographic selectivity.

The starting materials for the preparation of the compositions used in the process of the present invention include those zeolite compositions in which at least a majority is of the faujasite type, preferably those having Si/Al ratios of about 1–2, e.g. the X-type zeolites. Such base materials are exchanged usually but not necessarily, from their sodium form to a state containing at least a majority of their cationic content in polyvalent form. Any conventional ion exchange procedure which will produce this effect is suitable. It has been found that minor amounts of inert binders, such as clays, and/or other solid materials including other zeolitic components may be present without adversely affecting the attainment of the unexpectedly superior adsorption properties of the compositions of the process of the present invention.

In one embodiment of the process for preparing the compositions used in this invention, the starting material is ion exchanged in the presence of an excess of a water soluble salt, such as a chloride, nitrate, sulfate, and the like, of any polyvalent metal. The polyvalent metals can be of the divalent and trivalent transition elements of Groups 1b to 7b and Group 8 of the Periodic Table, the divalent alkaline earth metal elements of Group 2a and the lanthanide rare earth series. Preferably the polyvalent metal is selected from the group consisting of magnesium, calcium, strontium, barium and mixtures thereof. Still more preferably the polyvalent metal is calcium. One example of a conventional ion exchange procedure is to repeatedly exchange the starting material with the polyvalent material in an aqueous solution at temperatures up to those at which reflux occurs, e.g. up to about 100° C. and about 1 atmosphere, for a period of 2 to 48 hours until at least a major portion of the original cations in the faujasitic portion of the starting material are replaced by polyvalent ions.

Once prepared with at least a majority of cationic content in the polyvalent state and washed substantially free of excess, non-exchanged cations, the materials are ready for thermal activation.

It is known that high charge density polyvalent ions within zeolites, especially faujasites undergo a substantial degree of hydroxylation during thermal activation. This is not true of NaX type of zeolites which are more stable towards thermal activation. Hydration is an equilibrium reaction which may be represented as:

$$M^{n+} + XH_2O \rightleftharpoons M(OH)_e^{(n-e)+} + eH^+ + (X-e)H_2O \qquad (I)$$

wherein M is at least one cation having a valance n of 2 or 3, X is 1 to 6 and e is 1 or 2.

The products on the right side of the equation are detrimental to the zeolite adsorbents. Hydroxylated multivalent cations, such as $Ca(OH)^+$, are known to be, ineffective sites for the selective adsorption, especially for $N_2$. See H. Minato and M. Watanabe, Scientific Paper General Education University of Tokyo, Vol. 28, which refers to natural zeolite, particularly mordenite, page 135 (1978). Additionally, zeolite frameworks are generally unstable towards $H^+$. This is especially true for zeolites whose Si/Al ratio is relatively low, as for example faujasites with a Si/Al ratio of 1.0–2.0. The equilibrium may be directed towards the desirable polyvalent cations and away from the destructive $H^+$ and ineffective hydroxylated cations by minimizing the amount of water present at any given temperature during the thermal activation, particularly temperatures above 150° C.

It has been found that a lack of appropriate attention to initial drying conditions results in a substantial reduction in the subsequent adsorption properties after thermal activation at higher temperatures. This initial drying should be conducted either at temperatures ranging from ambient to no greater than 200° C., preferably no greater than 120° C. or under a vacuum or sufficient flow of purge gas at higher temperatures.

Thermal activation is achieved by raising the temperature from the level of the preactivation drying to temperatures no greater than 650° C., preferably about 350° to 450° C.

At a given purge gas rate, slowing the rise of temperature increase is found to have a beneficial effect on adsorption properties. The purge gas can be any nonreactive gas such as dry air, nitrogen, neon, helium and the like. The slow temperature increase allows the water in the zeolite to more nearly come to thermal equilibrium on desorption at any given temperature.

Conversely, at a given temperature ramp, rapid purging is found to have a beneficial effect on adsorption properties by more completely sweeping away water as it is desorbed.

The exact temperature rise and purge rate necessary to produce the adsorbent compositions for use in this invention during thermal activation can vary and can depend on the configuration of the adsorbent bed.

In another embodiment of the process for preparing the compositions of this invention, the dried polyvalent exchanged zeolite, which has not undergone temperatures greater than 200° C., preferably 120° C., is thermally activated by increasing the temperature ranging from ambient up to a maximum temperature of about 650° C. while maintaining a continuous purge of nonreactive gas through the zeolite being activated at rates in the range of 0.006 to 6 l/min., (i.e. G values in the range of 0.5 to 100 kg. mole/$m^2$-hr.) until the zeolite has reached the maximum activation temperature, preferably in the range of about 350° to 450° C. The zeolite is maintained at these conditions for a period of 12 to 48 hours. Longer periods of time can be employed, but are usually not required to obtain an adequate activation.

The exact temperature rise during the critical temperature range of 120° C. to 350° to 650° C. depends on the depth and diameter of bed within the thermal activation column, the flow rate of purge gas and the temperature conditions at any given moment of the temperature rise. However, it has been found that as long as the purge rate of the bed of material undergoing thermal activation is sufficient to achieve the desired residence times and molar mass velocities as discussed above or the bed is maintained under vacuum of at least 0.1 atmospheres, preferably less than 100 mm Hg, the temperature rise can be rapid, i.e. as high as 40° C./min.

The ideal parameter to use in defining the final state of the faujasitic zeolite, in relation to its utility in nitrogen selective gas separations, is the number of dehydrated/dehydroxylated (free) polyvalent ions. Since the experimental determination of this number can be elusive, the judicious use of other parameters which directly affect the free cation number can be utilized. Thus in equation II below, the parameters Z and W hold the following significance:

Z measures the accessibility of micropores, and since a large fraction of the exchangeable cations reside on the micropore walls, it also indicates the accessibility of cations.

W measures the hydroxylated state of the zeolite including both cations and framework. Since the polarizing effect of cations on adsorbed molecules is diminished in either case, then the amount of residual hydrogen inversely relates to the availability of cations.

A generalized CA Index has been developed which will be useful to conceptualize the state of an activated, polyvalent ion exchanged faujasite adsorbent for the separation of nitrogen containing gases such as air. This general index is given as:

$$CA=(Z/W)\cdot N\cdot Q\cdot F \qquad \text{(II)}$$

wherein $Z=O_2$ uptake at $-196°$ C., 20 Torr.

$W=D_2$ exchange at 400° C., 200 Torr expressed as gm equivalents of $H_2O$.

$N$=paramenter accounting for any variation in the number of cations contained in the unit cell. $N=1$ for an X zeolite with an $Si/Al=1.23$ and completely exchanged with a divalent cation.

$Q$=parameter accounting for the presence of polyvalent ions other than calcium. $Q=1$ for an X zeolite completely exchanged with calcium.

$F$=parameter accounting for the fraction of A zeolite. $F=1$ when the zeolite phase is 100% X.

The CA Index is proportional to the number of available cations that will selectively interact with nitrogen. Variations in Z and W which do not reflect or pertain to the dehydrated/dehydroxylated state of the zeolite must be removed through the parameters N, Q and F.

The foregoing parameters will account for variations in the zeolitic Si/Al ratio of the active phase, the variations in cation form and exchange level, and the inclusion of A zeolite as a minor phase. The full CA Index expression for any polyvalent ion form of an adsorbent containing a major faujasitic and minor A type portion as the only active phase is expressed as:

-continued $$CA\ \text{Index} = \frac{Z}{W}\ \frac{971.67\,(N_{Al}/n_{ave})}{(38.3-0.0421\,N_{Al})(34.7+\Sigma_i q_i f_i)(34.7-6.4\,f_A)} \qquad \text{(III)}$$

wherein $Z=O_2$ uptake at $-196°$ C., 20 Torr.

$W=D_2$ exchange at 400° C, 200 Torr, expressed as gm equivalents of water $N_{Al}$=the number of aluminums per unit cell $n_{ave}$=the average cation valency in the zeolite $q_i$=correction of Z for different cations and is determined from the appropriate calibration curve, e.g., values for Ca, Na, Sr are O, -1.7 and 1.0, respectively $f_i$=fraction of exchange equivalents of a particular cation $f_A$=fraction of A zeolite in the total zeolite phase present This generalized expression III only depends on the state or form of the dehydrated adsorbent and is independent of the amount of active phase present in the adsorbent.

Figure 5:
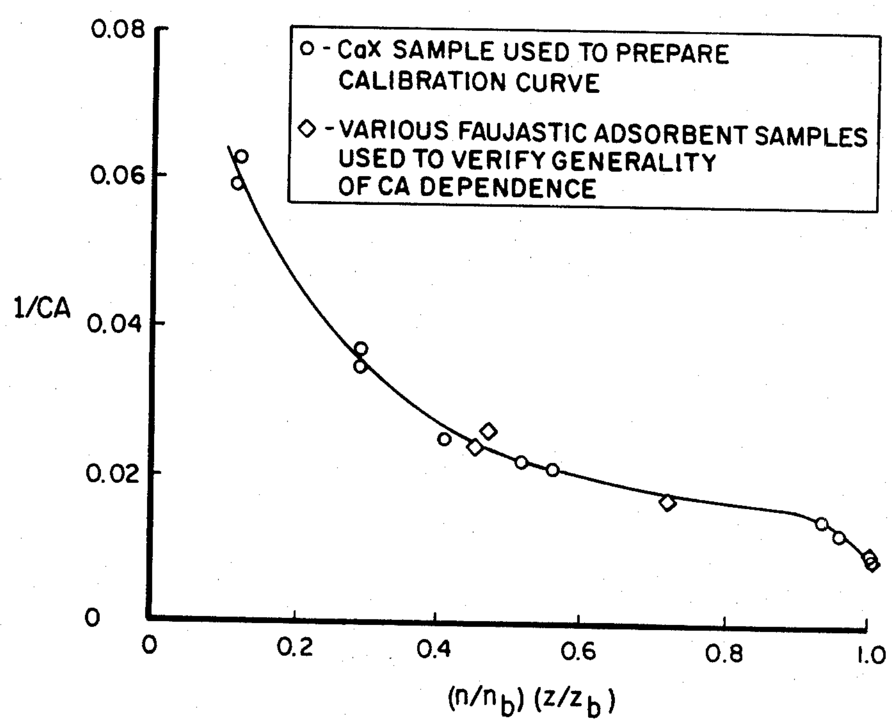
FIG. 5 is a plot of data showing the dependence of the CA Index on the state of the faujasitic adsorbents.

The procedure for developing a generalized calibration curve whereby the state of the material can be identified is a two-step one. First, the $N_2$ capacity of the faujasite based adsorbent is ratioed to the best $N_2$ capacity measured, $n/n_b$, and the $O_2$ uptake value is ratioed to the best $O_2$ uptake measured, $z/z_b$, for a properly activated faujasite zeolite of the same elemental composition. Second, the value of 1/CA is plotted versus the product $(n/n_b)(z/z_b)$. Such a plot is shown in FIG. 5 which defines the extent of cation accessibility. Using this relationship, the capacity ratio (or the state of the adsorbent) can be determined if the CA Index is known or vice versa.

The examples below are intended to illustrate the foregoing methods of preparing the compositions used in process of the present invention and to demonstrate the superiority of such compositions as selective adsorbents, especially in the separation of nitrogen from air and are not intended to restrict the scope thereof.

EXAMPLES

In these Examples prior to any of the adsorption capacity measurements, for nitrogen capacity and zeolite content by oxygen adsorption as described below, the zeolite samples were activated overnight at 400° C. under a vacuum of about $10^{-5}$ mm Hg. A heating rate of 1°-2° C. per minute was used to obtain the 400° C. temperature. In Examples 36-42 and Controls 45-51, adsorption measurements were done using a microbalance. For Examples 32, 34 and Controls 33-44 after activation, the samples were stored in a nitrogen dry box; however, momentary exposure to the atmosphere is unavoidable when the sample buckets of the McBain-Bakr spring balance are charged.

Before the nitrogen capacity measurements were made with the McBain-Bakr unit, the samples were outgassed in situ at 400° C. under $10^{-4}$ mm Hg overnight. The nitrogen capacities were measured at 30° C. with a nitrogen pressure of 760 torr. Adsorption was measured after an equilibration time of four hours.

The samples were again outgassed overnight in situ at 400° C. prior to determining zeolite content by oxygen adsorption. Zeolite content measurements of the Examples were determined using a modified version of Bolton's method; A. P. Bolton, "Experimental Methods in Catalytic Research," Vol. 11, R. B. Anderson and P. T. Dawson (editors), Academic Press, New York (1976), page 11. Instead of carrying out the experimentation at liquid oxygen temperature and 100 torr pressure, a similar experiment was conducted at −196° C. (liquid nitrogen temperature) and 20 torr. These conditions resulted in the same relative pressure, $p/p_o$ or 0.13 ($p_o$32 155 torr at 77° K. for oxygen). The measurements were made on a McBain-Bakr spring balance and duplicate analyses of the same CaX adsorbent agreed within 2%.

Since the accessible micropore volume for adsorption of adsorbates is the physical quantity of interest, it is more appropriate to employ adsorption methods for determining apparent zeolite content than the more conventional X-ray line intensity measurements. The pore blockage which can occur from a reduction in zeolite content can prevent an adsorbate from interacting with a portion of the micropore volume, whereas X-ray determination of crystallinity would include this micropore volume which is inaccessible to the adsorbates of interest. Therefore, of interest to this work and related adsorption studies is the accessibility of micropore volume to gases of interest which is most readily measured using a vapor possessing a low heat of adsorption such as oxygen at low temperatures. In addition, oxygen interacts in a more nonspecific manner with different sites in the zeolite than nitrogen or other adsorbates.

Another adsorption method for determining zeolite content; i.e., t-plot, was also employed in Examples 27–29. This required that $N_2$ adsorption isotherm data at −195° C. (obtained from an automated instrument) be converted to a t-plot using Deboers method (J. Colloid Interface Sci, 21, 405 (1966)). The micropore $N_2$ uptake was estimated from the t-plot using an approach put forward by Sing (Chemistry and Industry, May 20, 1967, p. 829). Since most binders and amorphous inclusions lack micropores, it was postulated that the zeolite content is directly proportional to the microporeuptake. Thus, the latter can be used as it is for comparing the zeolite content of adsorbents, or can be used to estimate the absolute value of the zeolite content by comparison with the uptake of a standard adsorbent. In all these comparisons, care was taken to compare only adsorbents that had the same cationic form and cation loading.

Zeolite content determinations using X-ray diffraction on sodium and/or calcium exchanged X zeolites were performed for Examples 27–29 and 32 using a method that involves addition of alpha-$Al_2O_3$ to the zeolite as an internal standard and the ratioing of selected zeolite lines to the standard using integrated peak areas.

Nitrogen and oxygen isotherms were determined in most cases using a microbalance at temperatures as indicated. In each case the activation was carried out at 400° C. under about $10^{-5}$ mm Hg vacuum until no detectable weight loss occurred (0.004% change).

Deuterium exchanges reported in Examples 36–42 and Controls 45–50 below were determined after the adsorbents were activated at 2° C./minute under less than or equal to $10^{-5}$ mm Hg to 400° C. and held at that temperature for 16 hours. A control experiment showed that the polyvalent ion exchange adsorbent could be completely exchanged with deuterium; and, once exchanged, all the deuterium could be back-exchanged with hydrogen.

The number of aluminums per unit cell ($N_{Al}$) is determined by measuring unit cell constants ($a_o$) using accepted X-ray methods and finding the appropriate value using an established calibration curve for the same ion form. For calcium faujasites, least square fit of the calibration standards gives:

$$N_{Al}=181.56\,(a_o-24.419) \qquad \text{(IV)}$$

The amount of A and X zeolite present in an adsorbent (required to calculate $f_a$) are determined by X-ray diffraction. The method involves addition of alpha-$Al_2O_3$ to the sample as an internal standard and establishing ratios of integrated peak areas for selected zeolite lines to standards in the same ion form.

The gas chromatographic (GC) procedure used to evaluate the compositions of these Examples for selectivity and indications of nitrogen capacity trends is well accepted and similar to that used by several workers; see for example, J. R. Conder and C. L. Young, "Physiocochemical Measurement by Gas Chromatography", John-Wiley (1979); R. J. Neddenriep, J. Coloid Interface Science, 28, 293 (1968); D. Atkinson and G. Curthoys, JCS Faraday Transactions I, 77 897 (1981); and A. V. Kiselev and Y. I. Yashin, Gas-Adsorption Chromatography, Plenum Press (1969) pp. 120–125. Except where noted the samples were thermally activated in the GC column at 2° C./min. to 400° C. under a 100 cc/min. flow of zero grade helium and maintained at 400° C. for 16 hours. Inert gas retention volumes for each column were determined at 300° C. using 10% Ne in helium. The GC method was limited to the low pressure region of the isotherm and represents a limiting value for the selectivities that might be approached in the adsorption of nitrogen-oxygen mixtures at zero coverage. Nevertheless the method is rapid and valuable for screening and ranking adsorbent performance and is reproducible to within 10%.

The retention volume of an injected species into the adsorbent is the product of the retention time and the corrected flow rate. Thus one can calculate the retention volume, $V_I$, of inert species (from neon retention data at 300° C.), and the retention volume, $V_j$, of the jth adsorbate at different temperatures.

The adsorption equilibrium constant for the jth adsorbate can be calculated from the following equation:

$$K_j=(V_j-V_I)/w_s \qquad \text{(V)}$$

K has the unit cc/gm or moles/gm/moles/cc. K is the initial slope of an adsorption isotherm in which the quantity on the ordinate has the units of moles/g. and that of the abcissa has the units of moles/cc. Using ideal gas law as follows, K can be converted to the initial slope $C_1$ of the isotherm in which the quantity on the abcissa is the (partial) pressure of the adsorbate in units of pressure; see FIGS. 2 and 3, for example. (Isotherms from gravimetric or volumetric data are usually of the latter form.):

$$C_1=(K/RT_{column}) \qquad \text{(VI)}$$

where R is the gas constant (=82.05 cc-atm/mole-°K.) and T is the GC column temperature in °K. (the subscript "column" will be omitted hereinafter and T will denote the column temperature).

Multiplication of $C_1$ by the molecular weight of the adsorbate gives the quantity $C_2$ which has the units of g.(adsorbate)/g. (adsorbent)/atm.

The selectivity ratio of species 2 over species 1, $\alpha_1{}^2$, is defined as $$\alpha_1^2 = \frac{\bar{n}_2 n_1}{n_2 \bar{n}_1} \quad \text{(VII)}$$

where n is the number of moles in the gas phase and n is the number in the adsorbed phase.

The selectivity ratio of, for example, $N_2$-$O_2$ separation is calculated from:

$$\alpha_{O2}^{N2} = \frac{K_{N2}}{K_{O2}} \quad \text{(VIII)}$$

Several Group I and II metal exchanged X zeolites were prepared and evaluated in these Examples. The exchange procedure described in Example 1 is typical. Though studies have shown that the procedures used are not critical as long as greater than 80% levels of exchange were achieved. The gas chromatograph was employed routinely to screen the various ion exchanged adsorbents using the procedure described in detail in Example 1 below.

EXAMPLE 1

An 0.45 kg. sample of 8–12 mesh beads of 13X (NaX) zeolite obtained from Davison Division of W. R. Grace having a Si/Al=1.25 was exchanged with one liter of 1M $CaCl_2.2H_2O$. The 1M $CaCl_2.6H_2O$ was added slowly to the zeolite contained in a two liter round bottom flask equipped with a condenser and thermometer. The solution was brought to 90° to 95° C. over a thirty minute period and held there for an additional hour. The exchange solution was removed and the beads of 13X were washed three times with approximately a liter of distilled water for each wash. After washing, the beads were allowed to soak in distilled water for approximately fifteen minutes to assure that the zeolite was completely free of any excess $CaCl_2$ solution. After the three washes, a fresh one liter portion of 1M $CaCl_2.2H_2O$ was added to the zeolite beads and the flask was again brought to 95° C. These exchange procedures were repeated three additional times for a total of four exchanges. After the final washes, the resulting highly calcium exchanged zeolitic adsorbent was placed in a flat pan and dried with a current of dry nitrogen at ambient temperature. Elemental analysis showed that 95% of the ion exchange capacity had been converted to the calcium form.

A weighed amount of the resulting CaX composition was packed into a three foot ¼ inch O.D. copper tube. The packed column was weighed and placed in a GC column and was thermally activated in the manner set forth above. After thermal activation, the column was brought to 300° C., the flow was reduced to 30 cc/min., and equilibrated there for an hour, then the dead volume of the column was determined by injecting a 0.5 cc pulse of neon gas.

The carrier flow rate at each column outlet was measured using a bubble flow meter and corrected using standard procedures to account for the difference in temperature and pressure between the flow meter and column. Following the dead volume measurement, the retention volumes of 2% $O_2$ and 8% $N_2$ in helium, carrier flow rates and associated data were collected at 50°, 40° and 30° C. in a manner analogous to the measurement of the neon at 300° C. For each new temperature an hour equilibration time was required. Following the GC evaluation, the column was removed from the GC and weighed again and the dry weight of zeolite was obtained by subtracting the weight of water lost. Using the retention volume data for Ne, $O_2$ and $N_2$ gathered and the weight of the dry adsorbent, Henry's law slope expressed as mmoles/g/atm and the $N_2/O_2$ selectivity were obtained.

The CaX composition of Example 1 had a GC selectivity (separation factor) of 13.1 at 30° C. and a 0.82 mmoles/g $N_2$ capacity of 30° C. and 1 atm.

CONTROL 1

Linde 5A (CaA) molecular sieves having a Si/Al molar ratio of about 1 in the form of 1/16 inch extrudate were packed in the same GC column of Example 1. This calcium form of zeolite was evaluated by the GC procedure described in Example 1 and found to have a heat of adsorption of 6.1 cal./mole of nitrogen and a selectivity ratio of 4.8 and 4.0 at 30° C. and 50° C., respectively. This adsorbent because of its relatively good selectivity is stated in the literature as the adsorbent of choice in the economically viable pressure swing adsorption process used in commercial air separation plants; see "The Properties and Applications of Zeolites", edited by R. P. Townsent, the Chemical Society, Burlington House, London (1980) pages 92–102.

EXAMPLE 2

A 2,000 gram sample of synthetic sodium faujasite designated as Linde 13X obtained from the Linde Division in the form of ⅛" extrudate and having a Si/Al molar ratio of about 1.25 was exchanged with 4 liters of a 1M $CaCl_2$ aqueous solution. The $CaCl_2$ aqueous solution was prepared by dissolving 588.1 grams of $CaCl_2$ dihydrate in 4 liters of distilled water. The slurry of zeolite in the aqueous solution was refluxed for 1 hour, drained, washed with 5 liters of distilled water, soaked and drained again. The preceding procedure was repeated with an additional draining and washing step. The zeolite was soaked in the 4 liter 1M $CaCl_2$ solution overnight, refluxed for 1 hour, drained, washed twice, and refluxed in 4 liters of 1M calcium chloride solution for the fourth time. The zeolite was then drained and washed a number of times to assure that all of the residual $CaCl_2$ had been removed. The resulting zeolite was believed to contain a high level of calcium, since similar ion exchange procedures with pure Linde X powder resulted in greater than 95% exchange. These pellets were dried in an oven using a strong nitrogen purge at 100° C. overnight for about 17 hours. This sample was further dried under a mechanical pump vacuum at less than 50 mm Hg at 100° C. for an additional 8 hours. The zeolite was then dried for 4 more hours at 150° C., 200° C., 250° C. and finally, about 290° C. under this vacuum. The resulting sample contained less than 2% by weight water content before it was thermally activated in the same manner as that used to thermally activate the zeolite of Example 1.

It was found that the selectivity ratio for this sample averaged 12.5 at 30° C. for 2 runs and the nitrogen capacity at 30° C. and 1 atm. was 0.64 mmoles/g.

CONTROL 2

The procedure of Example 2 was again repeated except that the bulk of the 2 kg. sample was dried under nitrogen purge at 225° C. to a level of only about 10% by weight water. The GC selectivity ratio was found to be 4.4 at 30° C. and the nitrogen capacity at 1 atm. was found to be only 0.16 mmoles/g.

EXAMPLES 3-6

Several Group II metal exchanged X zeolites were prepared and evaluated by exchanging 200 grams of this material in the form of 8-12 mesh pellets obtained from Davison Division with 400 cc of aqueous solution of the appropriate metal chloride at a concentration so that sufficient equivalents were present to displace substantially all of the sodium originally present in this Na form of zeolite (5.83 Meq/gram).

Each of the samples prepared in accordance with Examples 3-6 were prepared by carrying out 6 exchanges each lasting 12 hours at reflux temperatures after which each sample was thoroughly washed with distilled water and dried at ambient temperatures. Elemental analysis showed that in each example, an 80% or greater level of exchange was obtained.

Table I below summarizes the selectivities zeolite capacities obtained from the GC evaluation for Examples 3-6 and clearly shows that when the ion exchanged adsorbents were activated in accordance with the present invention, the opposite trend for alkaline earth cations was obtained in comparison to the results set forth in Table II below as reported in the prior art.

CONTROLS 4-5

13X and lithium exchanged X zeolites of the same type used in Examples 3-6 were subjected to the same activation technique as set forth under Examples 3—6 and the selectivities and zeolite capacities for the controls are summarized in Table I below.

TABLE I

EVALUATION OF CATION EXCHANGED 13X-TYPE ZEOLITES

| EXAMPLE/ | CONTROL | CATION | EXCHANGE LEVEL | GC $N_2/O_2$ SELECTIVITY @ 30° C. | ZEOLITE CAPACITY FOR $N_2$ (mmoles/g.) 30° C., 1 atm. |
|---|---|---|---|---|---|
| — | 4 | Li | 81 | 5.6 | 0.34 |
| — | 5 | Na | 98 | 3.1[a] | 0.25 |
| 3 | — | Mg | 80 | 5.5 | 0.21 |
| 4 | — | Ca | 95 | 13.1 | 0.82 |
| 5 | — | Sr | 88 | 6.4 | 0.62 |
| 6 | — | Ba | 90 | 2.9 | 0.37 |

[a] $N_2/O_2$ selectivity was 2.6 at 50° with or without the same thermal activation technique of Examples 3-6.

CONTROLS 6-14

Table II below summarizes the nitrogen-oxygen separation factors and zeolite capacities for various ion exchanged 13X zeolites at −78° C. for a 25% $O_2$—75% $N_2$ gas mixture at 1 atm. total pressure. The data was taken from the prior art.

TABLE II

SELECTIVITIES AND CAPACITIES OF ION EXCHANGED 3X-TYPE ZEOLITES AT −78° C. FOR A 25% $O_2$-75% $N_2$ MIXTURE AT 1 ATM TOTAL PRESSURE[a]

| CONTROL | ADSORBENT | EXCHANGE LEVEL | $N_2/O_2$ SELECTIVITY | ZEOLITE CAPACITY FOR $N_2$, CC STP/g. |
|---|---|---|---|---|
| 6 | Li—X | 86 | 7.6 | 111.8 |
| 7 | Na—X | 100 | 4.9 | 72.4 |
| 8 | K—X | 100 | 2.2 | 58.7 |
| 9 | Rb—X | 56 | 3.5 | 30.0 |
| 10 | Cs—X | 50 | 1.5 | 26.3 |
| 11 | Mg—X | 56 | 2.4 | 50.1 |
| 12 | Ca—X | 96 | 4.5 | 37.8 |
| 13 | Sr—X | 96 | 8.6 | 52.7 |
| 14 | Ba—X | 85 | 15.8 | 62.7 |

[a] Data obtained from U.S. Pat. Nos. 3,140,932 and 3,140,933.

The data in Table II shows that the separation factors increased for Group I cation exchanged forms, the alkali metals, as the charge density of the cation increased. While it would be expected that the same trend would hold for the Group II cation exchanged forms, the alkaline earth ions, the values presented above in Table II show the opposite trend.

EXAMPLE 7

The composition of Example 7 was prepared in the same manner as set forth in Example 1 except that the wet exchanged zeolite was superficiously dried at 100° C. under a nitrogen purge for two days prior to any subsequent thermal activation step to determine adsorption properties. The GC selectivity and Henry's law slope at 30° C. for the resulting composition were 12.5 and 2.6, respectively. The nitrogen capacity at 1 atm, 30° C. remained at 0.82 mmoles/g. The $N_2/O_2$ selectivity at 50° C. and its zeolite content determined by nitrogen capacity measurements at −196° C. and 1 atmosphere pressure are set forth in Table III below.

CONTROLS 15-20

The $N_2/O_2$ selectivity at 50° C. and the zeolite capacity for nitrogen at −196° C. and 1 atmosphere for a calcium exchanged X zeolite containing substantially the same calcium loading as the adsorbent of Example 7 above are compared in Table III below as well as the $N_2/O_2$ selectivities for other calcium loaded X zeolites of the prior art.

TABLE III

ADSORPTION PROPERTIES FOR CaX-TYPE ADSORBENTS

| EXAMPLE/ | CONTROL | CALCIUM LEVEL | GC $N_2/O_2$ SELECTIVITY | ZEOLITE CAPACITY FOR $N_2$ (cc STP/g.) −196° C. 1 atm | REFERENCE |
|---|---|---|---|---|---|
| — | 15 | 90 | 10.4[a] | 165 | 1 |
| — | 16 | —[d] | 3.4[a] | 154 | 1 |
| — | 17 | 80 | 4.2[b,c] | NA | 2 |
| — | 18 | 64 | 3.5[b] | NA | 3 |
| — | 19 | 88 | 5.6[b] | NA | 3 |
| — | 20 | (90)[e] | 6.7[b] | NA | 4 |

TABLE III-continued

| ADSORPTION PROPERTIES FOR CaX-TYPE ADSORBENTS | | | | | |
|---|---|---|---|---|---|
| EXAMPLE/ | CONTROL | CALCIUM LEVEL | GC $N_2/O_2$ SELECTIVITY | ZEOLITE CAPACITY FOR $N_2$ (cc STP/g.) −196° C. 1 atm | REFERENCE |
| 7 | — | 94 | 12.5[b] | 149 | — |

[a]Selectivity at 50° C.
[b]Selectivity at 30° C.
[c]Value estimated from data given at 10 or 20° C.
[d]13X form before exchange.
[e]Not stated but inferred from another reference by the same authors.
NA = Not available.

References:

1 Habgood, H. W., "Adsorptive and Gas Chromatographic Properties of Various Cationic Forms of Zeolite X"; Canadian Journal of Chemistry Vol. 1964, pages 2340–2350.
2 Friedrich Wolf, Peter Konig, E. German Patent No. 110,478 (1974).
3 F. Wolf, P. Konig, and K. Gruner; Z Chem. Vol. 15, 36–37 (1975).
4 T. G. Andronikashuili, T. A Chumbridze and G. V. Tsitsishvili; Izv. Akad. Nauk, Grvz. SSR, Ser. Khim., Vol. 1, No. 4, pages 339–402 (1975) (Translated Russian Article).

From the data set forth in Table III above, the only adsorbent that appears to even approach that of the present invention is disclosed in reference 1. The commercial zeolite that was used in the reference experiment was the Linde Division NaX molecular sieve in the form of 1/16" pellets having approximately 20% clay binder which is stated in the reference to be assumed to have negligible adsorptive properties. The zeolite used in Example 7 was a Davison 13X zeolite having approximately 30% binder which had negligible adsorption properties.

As shown in Table I, the $N_2/O_2$ selectivity determined from GC and limited to the low pressure region for the 13X zeolite at 50° C. is 2.6, which is the accepted value in the prior art. These values are in sharp contrast to the selectivity of 3.4 at 50° C. for the 13X zeolite reported in reference 1. A consistent over-estimate of the $V_I$ (see equation V above) will result in a consistently higher value in the calculation for the $N_2/O_2$ selectivity. Based on the accepted value of 2.6, the over-estimate in reference 1 for the 13X selectivity is about 24%. Therefore, assuming the same over-estimate of $V_I$ in the calculation of CaX zeolite, the selectivity is calculated to be no higher than 8.2 in contrast to the 10.4 reported in reference 1. The 8.2 value is substantially the same as that obtained for a CaX zeolite in which the initial drying was done at 250° C. before conducting the thermal activation of 16 hours at 400° C. The foregoing is believed to support the fact that the CaX zeolite of reference 1 was subjected to a conventional drying step.

EXAMPLES 8-9

The same procedures in Examples 2 and 1, respectively were followed to prepare the Examples 8-9 compositions except that Linde NaX powder was used as the starting material. The nitrogen uptake capacity or zeolite capacity at 77° K. (−196° C.) obtained on the Example 9 composition and the nitrogen capacities at 303° K. (30° C.) obtained on both of the compositions as well as those for the Examples 2 and 7 compositions are summarized in Table IV below.

CONTROLS 21-23

Zeolite capacities at 77° K. were obtained for the NaX powder received from Linde (Control 21) and the NaX 8-12 mesh pellets from Davison (Control 22) and the nitrogen capacities at 303° K. were obtained for the Controls 22 and 23 compositions. The latter was obtained by subjecting the Control 22 composition to the same type of ion exchange procedure as set forth in Example 1 to load the material with 95% of its ion capacity in the calcium form and then drying it in a conventional manner at 250° C. before determining its relative zeolite capacity and nitrogen capacity by the procedures set forth above.

Table IV below compares the capacity data obtained from Examples 8-9 and Controls 21-23 with that obtained from Example 7 and Controls 15-16.

A 24-26% increase in zeolite capacity at 77° K. was obtained in converting the sodium form to the calcium form using the process of the present invention; compare Controls 21 and 22 with Examples 9 and 7, respectively. There was over 240% increase in nitrogen capacity at 303° K. in making this conversion; compare Control 22 with Example 7.

The fact that there was only a 7% increase in zeolite capacity in converting from the sodium to the calcium form upon comparing the data reported from reference 1 (Controls 15-16) is further evidence that the CaX zeolite was subjected to a conventional drying step. The nitrogen capacity data obtained on Control 23 dried at such conventional drying conditions indicates some increase occurs, but nowhere near the increase of 240% obtained when the present process is followed.

TABLE IV

| ZEOLITE AND NITROGEN CAPACITIES FOR VARIOUS Na AND CaX SAMPLES | | | | | |
|---|---|---|---|---|---|
| EXAMPLE/ | CONTROL | SAMPLE | INITIAL DRYING | ZEOLITE CAPACITY FOR $N_2$ (cc STP $N_2$/g.) −196° C. 1 atm. | $N_2$ CAPACITY (mmole $N_2$/g) 30° C., 1 atm. |
| — | 15 | Linde 1/16" NaX | Unknown procedure of reference 1 | 154 | NA |
| — | 16 | Linde 1/16" CaX | Unknown procedure of reference 1 | 165 | NA |
| — | 21 | Linde NaX powder | As received | 169 | — |
| 8 | — | Linde CaX powder | Dried progress-NA sively to 300° C. under 50 mmHg | 0.93 | |
| 9 | | Linde CaX powder | Superficially dried at ambient temp. | 209 | 1.15 |
| — | 22 | Davison 8-12 mesh NaX | As received | 118 | 0.24 |
| 2 | — | Davison 8-12 mesh CaX | Dried progressively to 300° C. under 50 mmHg | 139 | 0.64 |
| 7 | — | Davison 8-12 mesh CaX | Superficially dried at ambient temp. | 149 | 0.82 |
| — | 23 | Davison 8-12 mesh CaX | 250° C. | 107 | 0.42 |

NA = Not available

EXAMPLES 10–16

Adsorbents were prepared in the manner set forth under Example 2 except that in each case the samples were subjected to the specific type of drying and activation conditions as set forth in Table V below.

CONTROLS 24–27

Adsorbents were prepared in the same manner as set forth under Examples 10–16 and were subjected to the specific drying and activation conditions summarized as noted in Table V below.

TABLE V

EVALUATION OF Ca—X[a] BY GC

| EXAMPLE | CONTROL | DRYING TEMPERATURE | ACTIVATION WITH He OVERNIGHT: TEMP RAMP[b] (°C./min) | G, (Kg. mole per $m^2$-hr.) | r, (min.) | GC RESULTS @ 30° C.: SELECTIVITY | HENRY'S LAW SLOPE (mmoles $N_2$/g/atm.) |
|---|---|---|---|---|---|---|---|
| 10 | — | (1) Air Dried at 25° C. | 40 | 16.1 | 0.15 | 10.8 | 1.5 |
| 11 | — | Air Dried at 25° C. | 2 | 16.1 | 0.15 | 12.0 | 2.4 |
| 12 | — | Air Dried at 25° C. | 2 | 4.39 | 0.45 | 11.3 | 1.6 |
| — | 24 | (2) At 100–150° C. under $N_2$ flow | 40 | 16.1 | 0.15 | 8.7 | 0.89 |
| — | 25 | At 100–150° C. under $N_2$ flow | 40 | 4.39 | 0.45 | 7.6 | 0.83 |
| 13 | — | At 100–150° C. under $N_2$ flow | 2 | 16.1 | 0.15 | 11.2 | 2.2 |
| 14 | — | At 100–150° C. under $N_2$ flow | 2 | 4.39 | 0.45 | 11.0 | 1.5 |
| 15 | — | (3) At 250° C. in a shallow bed | 2 | 16.1 | 0.15 | 11.3 | 1.5 |
| — | 26 | (4) At 250° C. in a deep bed | 2 | 16.1 | 0.15 | 10.9 | 0.89 |
| 16 | — | (5) 250° C.–300° C. under 50 mm Hg | 2 | 16.1 | 0.15 | 11.7 | 1.9 |

[a] All samples were prepared by exchanging four times with 1M $CaCl_2$ at reflux and drying as indicated.
[b] Final temperature was 400° C.

The data of Table V above indicates that when the CaX adsorbents were dried and activated under the mild conditions, of the process of the present invention, high selectivities and capacities were realized. These results were obtained when the adsorbent was dried and activated either under vacuum or high flows of purge gas to keep the partial pressure of water in the gas phase low. The exact conditions required to achieve an acceptable partial pressure vary depending on the configuration of the adsorption bed.

One will note that even when the material was first dried at the substantially ambient conditions of 25° C. and then rapidly activated at 40° C./min. and a linear velocity of purge gas of 16.1 kg. mole/$m^2$-hr and a residence time of 0.15 min. (Example 10), there was a reduction in the Henry's law slope indicating a reduction in nitrogen capacity, assuming the isotherms do not cross. This assumption is believed to be valid based on the fact that six isotherms for CaX samples obtained from various drying procedures have been measured and found not to cross; see the data plotted in FIG. 2. This reduction in Henry's law slope at 40° C./min. is to be compared to the slope obtained with a temperature ramp of 2° C./min. (Example 11). This loss in capacity can be explained by the fact that even though the initial drying temperature was maintained low and no loss of adsorption properties should have occurred, the rapid temperature ramp of 40° C./min. was a little too rapid for a G of 16.1 and 0.15 min. residence time. This fact is confirmed in Example 12 in which practically the same loss in adsorption properties including a destruction of zeolite content (as evidenced by the same Henry's law slope) occurred as in Example 10, because the rise of 2° C./min. was a little too rapid for a G of 4.39 and a residence time of 0.45 min. The purge rate must be rapid enough for any given temperature ramp to prevent a build-up of water partial pressure in the drying/activation system.

Similarly, the combination of an initial drying in the range of 100° to 150° C. and a rapid temperature rise of 40° C./min. either at G's of 16.1 or 4.39 and residence times of 0.15 or 0.45 min., respectively, resulted in irreversible damage to the desired adsorbent (Controls 24–25). This is especially the case when one compares these results with those of Example 13. These data further confirm that if the temperature ramp is maintained at a rapid pace without a corresponding increase in the purge gas flow rate, there is a substantial loss in nitrogen capacity due to a build up of water partial pressure in the gas phase at high temperatures which destroys a substantial number of the dehydrated/dehydroxylated sites of the adsorbent and significantly reduces the zeolite content.

Finally, the results of Control 26 dramatically illustrates when compared to the results of Example 14 that initially drying the zeolite at temperatures as high as 250° C. in a conventional deep bed results in a sufficient immediate loss of the dehydrated/dehydroxylated sites and zeolite content in the adsorbent such that subsequent activation under very controlled conditions of temperature ramp and flow rate does not result in any improvement in nitrogen capacity. On the other hand if the bed of adsorbent were maintained shallow or under a high enough vacuum, there will be no harmful buildup of water vapor pressure. To summarize, the best mode of operating from a practical standpoint is to remove the superficial or surface water of the adsorbent at temperatures no higher than 150° C. using a steady nitrogen purge and follow the drying steps with thermal activation with a substantial purge of inert gas as the temperature is increased to temperatures in the range of 350°–450° C. to prevent the partial pressure of water in the gas phase from increasing beyond tolerable limits.

EXAMPLES 17-26 AND CONTROLS 27-28

These examples are designed to show the effect of having the majority of the calcium ions in a dehydrated/dehydroxylated form and maintaining at least 70% of the initial zeolite content if superior adsorbent characteristics are to be realized. In all of the examples, a Davison 13X zeolite in the form of 8-12 mesh particles was exchanged in aqueous 1M $CaCl_2$ solutions at either ambient or reflux conditions as set forth in Table VI below using the number of exchanges noted to achieve the exchange level set forth in Table VI below, dried at 25° C. and activated in a GC column as described in Example 1 above.

The procedure as used in Examples 17-26 were used to prepare the controls in which the calcium loading was maintained at less than a majority of the original cations present in the zeolite.

In Table VI below, the exchange level and conditions are compared with the $N_2/O_2$ GC selectivities at 30° C. These data indicate that below 50% exchange level, there is a small positive correlation between selectivity as determined by the GC method and the level of calcium exchanged in the 13X zeolite. The exact exchange conditions are not critical since adsorbents obtained by ion exchanging at ambient temperatures over a period of days have similar GC selectivities and nitrogen capacities as those having the same calcium content and prepared at reflux temperatures. The data of Table VI is plotted on FIG. 1 and a dramatic change in the slope is noted at calcium loadings greater than 50% if all other steps of the method of the present invention are followed.

TABLE VI

DATA PLOTTED ON FIG. 1

| EXAMPLE/ | CONTROL | EX-CHANGE LEVEL | EXCHANGE CONDITIONS | $N_2/O_2$ GC SELECTIVITY AT 30° C. |
|---|---|---|---|---|
| — | 27 | 26 | Reflux | 3.1 |
| — | 28 | 44 | Reflux | 3.6 |
| 17 | — | 60 | Ambient | 5.3 |
| 18 | — | 64 | Ambient | 5.7 |
| 19 | — | 66 | Ambient | 5.2 |
| 20 | — | 64 | Reflux | 6.4 |
| 21 | — | 67 | Ambient | 7.1 |
| 22 | — | 71 | Reflux | 7.8 |
| 23 | — | 70 | Ambient | 8.3 |
| 24 | — | 75 | Ambient | 8.3 |
| 25 | — | 92 | Reflux | 11.8 |
| 26 | — | 95 | Ambient | 12.6 |

EXAMPLES 27-29 AND CONTROLS 29-31

Davison 13X zeolites having the zeolite content set forth in Table VII below were calcium exchanged using the same procedure as Example 1 and subjected to a variety of drying conditions. The isotherm data at 1 atm. which is summarized in Table VII and which is plotted against pressure in FIG. 2 were obtained by activating each sample to 400° C. under $10^{-5}$ mm Hg of vacuum until no detectable weight loss occurred (less than 0.004% change) with one exception. The adsorbent used to obtain the data for curve D shown in FIG. 2 was activated to 400° C. under nitrogen flow to a dew point of −37° C. The different activation procedure does not account for the large loss of adsorption characteristics noted in a comparison between curves A, B, C, C' and D.

The data of Example 27 used for the Curve A isotherm, were obtained on a sample with no prior thermal treatment, i.e. the drying was accomplished by setting the sample in a hood at ambient temperature. The sample of Example 28, the data of which is also shown in Curve A, was superficially dried by being placed in an oven at 100°-120° C. and then activated under a vacuum of $10^{-5}$ mmHg and a temperature ramps of 1.5 and 15° C./min., respectively. The isotherms for all three sets of conditions were the same.

Figure 2:
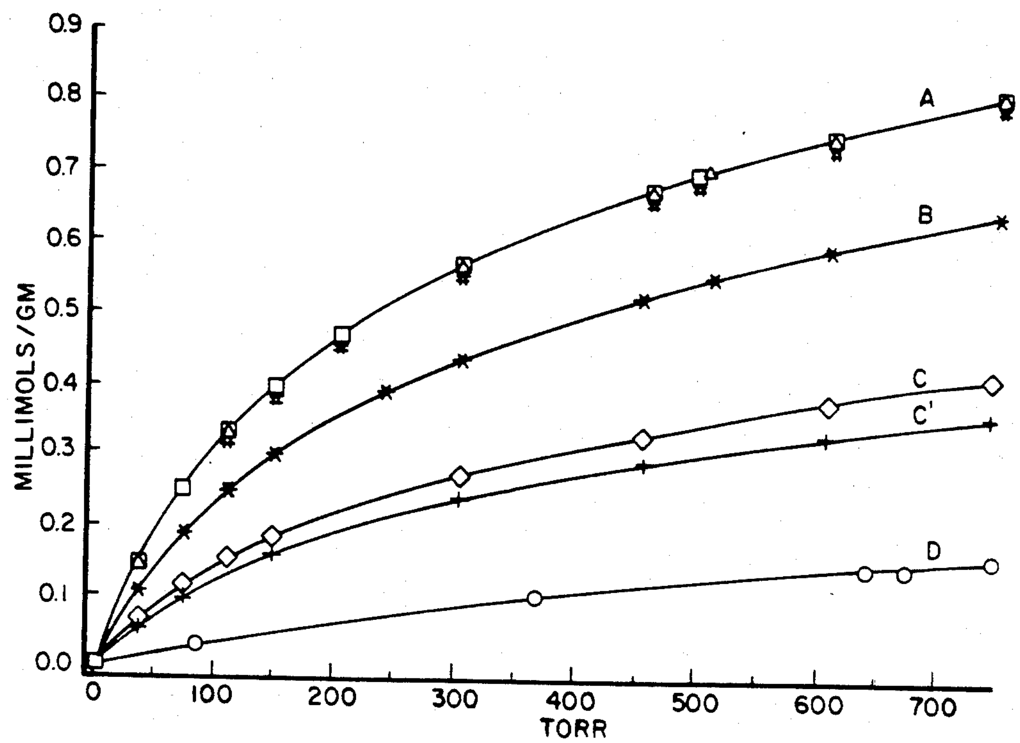
FIGS. 2 and 3 are nitrogen isotherms for various controls and examples of the present invention.

The adsorbent of Example 29 was dried progressively in a deep bed (14 cm) configuration to 300° C. under a mechanical pump vacuum at less than 50 mm Hg and the resulting isotherm after careful activation is shown in Curve B in FIG. 2. The Control 29 adsorbent was heated to 400° C. at 40° C./min. in a GC column with a 30 cc/min. helium purge ($G = 4.39$ Kg./hole/$m^2$-hr. and $r = 0.45$ min.) and the isotherm data was plotted as Curve C of FIG. 2. A comparison of the nitrogen capacities at 1 atmosphere show a 96% improvement between the data of Curves C and A resulting from the different thermal treatments. The 22% decrease in nitrogen capacity observed between the samples of Examples 27-28 and of Example 29 depicted by Curves A and B is largely due to some hydroxylated calcium ions being present in the zeolite. This is the case because the zeolite contents shown in Table VII below as determined by adsorbtive and X-ray methods were found to be substantially the same in Examples 27-29. The small difference in the degree in crystallinity cannot account for the reduction in nitrogen capacity and is further evidence that such a loss in capacity is due to incomplete cation dehydration/dehydroxylation rather than loss of zeolite content.

In Control 31, a sample of the CaX used to obtain Curve A was placed in a laboratory oven at 250° C. for two hours. A procedure typically used to activate a NaX zeolite before use. The nitrogen isotherm determined for this material is shown by Curve C' and is very similar to that obtained from rapid activation in the GC column.

Finally, a comparison between Curves A and D in FIG. 2 show a five-fold change in nitrogen capacity in which the Control 30 adsorbent was dried in a deep bed configuration in an oven at 225° C. under nitrogen purge. The resulting adsorbent whose isotherm is shown in Curve D was found to be inferior to the NaX zeolite. This result is consistent with the data reported in the literature for CaX and thus it is believed that this is the drying technique that was used in the prior art.

TABLE VII

EFFECT OF INITIAL DRYING ON CaX[a]

| EXAMPLE/CONTROL | | Ca LOADING | INITIAL DRYING | ZEOLITE CONTENT A | B | C | $N_2$ CAPACITY (1 atm) 30° C. ACTUAL | RELATIVE | GC @ 30° C.[b] $N_2/O_2$ SELECTIVITY | HENRY'S LAW SLOPE (mmole $N_2$/g/atm) |
|---|---|---|---|---|---|---|---|---|---|---|
| 27 | — | 94 | Ambient | 71 | 77 | 73 | 0.82 | 100 | 13.1 | 2.6 |
| 28 | — | 93 | 100-120° C. under $N_2$ | 70 | 76 | 72 | 0.82 | 100 | 12.7 | 2.5 |

TABLE VII-continued

EFFECT OF INITIAL DRYING ON CaX[a]

| EXAMPLE | CONTROL | Ca LOADING | INITIAL DRYING | ZEOLITE CONTENT A | ZEOLITE CONTENT B | ZEOLITE CONTENT C | $N_2$ CAPACITY (1 atm) 30° C. ACTUAL | $N_2$ CAPACITY (1 atm) 30° C. RELATIVE | GC @ 30° C.[b] $N_2/O_2$ SELECTIVITY | GC @ 30° C.[b] HENRY'S LAW SLOPE (mmole $N_2$/g/atm) |
|---|---|---|---|---|---|---|---|---|---|---|
| 29 | — | 94 | purge progressively to 300° C. at 50 mm Hg | 66 | 70 | 69 | 0.64 | 78 | 12.5 | 2.2 |
| — | 29 | 93 | dried at 40° C./min. in GC column | NA | NA | 59 | 0.42 | 51 | 11.2 | 1.3 |
| — | 30 | 95 | 225° C. under $N_2$ purge | 17.0 | 22.4 | NA | 0.16 | 19.5 | 10.4 | 0.78 |
| — | 31 | 93 | dried in oven at 250° C. for 2 hours | 35 | 42 | 62 | 0.38 | 34.1 | 11.6 | 0.94 |

[a]All samples prepared from 8-12 mesh Davison NaX for four exchangers with 1M $CaCl_2$.
[b]Activation at 2° C./min to 400° C. under 100 cc/min. He purge.
A — t-plot method
B — Oxygen adsorption at −196° C., 20 torr.
C — X-ray line intensity measurements.

In the presence of high vacuum or a high pure rate, an increase in the temperature during thermal activation from 1.5° to 15° C./min. did not alter the isotherm as shown in Curve A of FIG. 2. This suggests that as long as the water is being removed efficiently, the production of any significant quantity of steam is avoided and therefore the framework hydrolysis is not possible. The data for selective examples and controls for zeolite content were determined by both adsorptive and X-ray diffraction methods and the results summarized in Table VII above indicate that significant decreases of the zeolite content occurs as more severe drying and thermal activation conditions are employed.

Estimations of nitrogen-oxygen separation factors were calculated using the Ideal Adsorbed Solution Theory as described by Meyers and Prausnitz for the two highly exchanged calcium X samples described in Example 28 and (J. AIChE 11, 121 (1965)) Control 30. Nitrogen and oxygen isotherms at 32° C. were obtained for both materials using a volumetric adsorption apparatus after activation under flowing nitrogen to 400° C. and maintained at 400° C. until a dew point lower than −35° C. was achieved. The CaX sample superficially dried at 100° C. (similar to curve A in FIG. 2) resulted in a calculated selectivity at one atmosphere of 8.4 whereas the CaX initially dried to 225° C. (curve D in FIG. 2) resulted in a selectivity of 3.9. Therefore, the large decrease in adsorptive nitrogen capacity is accompanied by a large decrease in selectivity resulting in an adsorbent that is very similar to the NaX adsorbent. It is believed that cation hydrolysis and considerable reduction in zeolite content occur if samples of CaX are more than superficially dried.

In comparison to NaX zeolite, the stability of the zeolitic framework in the CaX form is reduced causing a higher loss of zeolite content to occur when exposed to the severe drying and activation conditions that do not alter the sodium form. The hydrolysis of the framework and calcium ions (resulting in Ca-OH species possessing much lower charge density) contributes to the decreased nitrogen capacities which were obtained in these examples and controls.

EXAMPLES 30-31

The same procedure as set forth under Example 2 above was used to prepare the adsorbents of Examples 30 and 31 which were each dried under ambient conditions. The adsorbent of Example 30 was placed under $10^{-5}$ mm Hg of vacuum as the temperature was increased to 400° C. The adsorbent of Example 31 was heated to 400° C. under a nitrogen flow until the dew point reached less than −35° C.

Figure 3:
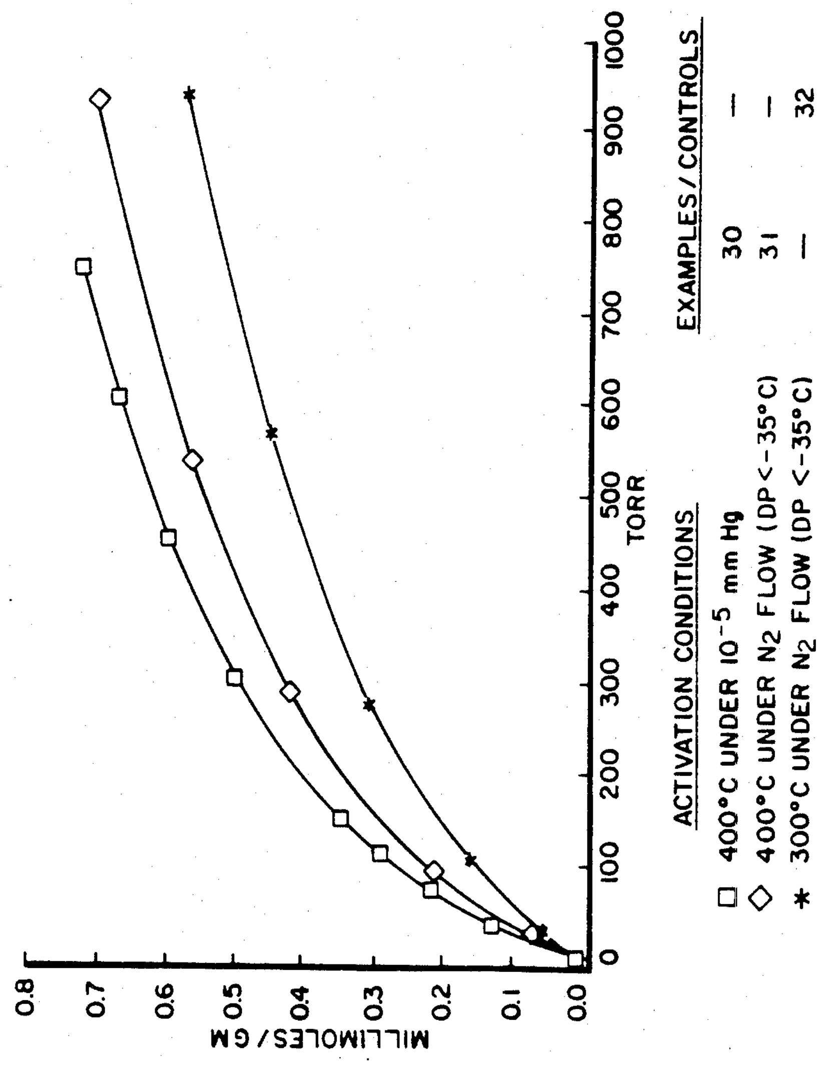

The nitrogen isotherms for Examples 30 and 31 are plotted in FIG. 3.

CONTROL 32

The procedure of Example 31 was repeated except that the maximum activation temperature was only 300° C. The isotherm for this control is also plotted in FIG. 3.

The isotherms of FIG. 3 illustrate the considerable improvement that is realized in thermally activating at temperatures of 400° C. rather than at 300° C. The improvement shown in nitrogen capacity is not simply the result of removing bound water, since no water bands were detected upon measurement and by infrared spectroscopy, but rather the result of dehydroxylation of some of the Ca-OH species formed by cation hydrolysis. Infrared spectra that had been gathered in connection with Examples 30 to 31 and Control 32 show qualitatively a decrease of the hydroxyl band assigned to the Ca-OH and an increase in the integrated intensity of the nitrogen band when the activation temperature of the CaX sample is increased from 300° to 400° C. The infrared data also showed that some hydrolysis does occur suggesting that even milder or more controlled activation conditions will result in further improvements in the adsorption characteristics.

EXAMPLES 32 AND CONTROLS 33-43

Seventy gram samples of the CaX prepared as described in Example 1 and samples of the starting NaX zeolite after being saturated with water were dried in a laboratory oven in a deep bed (14 cm) at different temperatures as detailed in Table VIII below. For each experiment, a sample of NaX and CaX was placed directly into the oven at the desired temperature and remained there for two hours. After the drying procedure, $N_2$ capacities at 30° C., atmosphere and zeolite content determinations using both adsorption and X-ray methods were made for each of the samples.

The results are tabulated in Table VIII below and graphically illustrated in FIG. 4 for Example 32 and Controls 33–39 and show that there is definitely a difference appearing in the relative stabilities of the sodium and calcium forms of X zeolite. As the drying temperature increases, the percent decrease in nitrogen capacity of the sodium form is much less than that of the corresponding calcium form. Comparison of the absolute values of nitrogen capacity show that CaX dried at 250° C. is only slightly higher than the sodium control sample.

In Controls 40–41, samples of NaX and CaX were placed in a shallow bed (1 cm) and dried at 250° C. in the manner described above. As seen in Table VIII below, even in the shallow bed configuration there was a substantially greater loss of nitrogen capacity for CaX sample.

In Controls 42–43, the samples were dried in the deep bed (14 cm) as described above with a vigorous dry nitrogen purge ranging from 2–10 liters/min. for the two-hour period. As seen in Table VIII, there is still a significant loss of nitrogen capacity for the calcium X sample for such a deep bed configuration.

Comparison of the two independent methods for measuring apparent zeolite content show that a large decrease in accessible micropore volume to oxygen results from drying CaX at high temperature whereas the reduction in zeolite content is indicted to be much less by X-ray methods.

Figure 4:
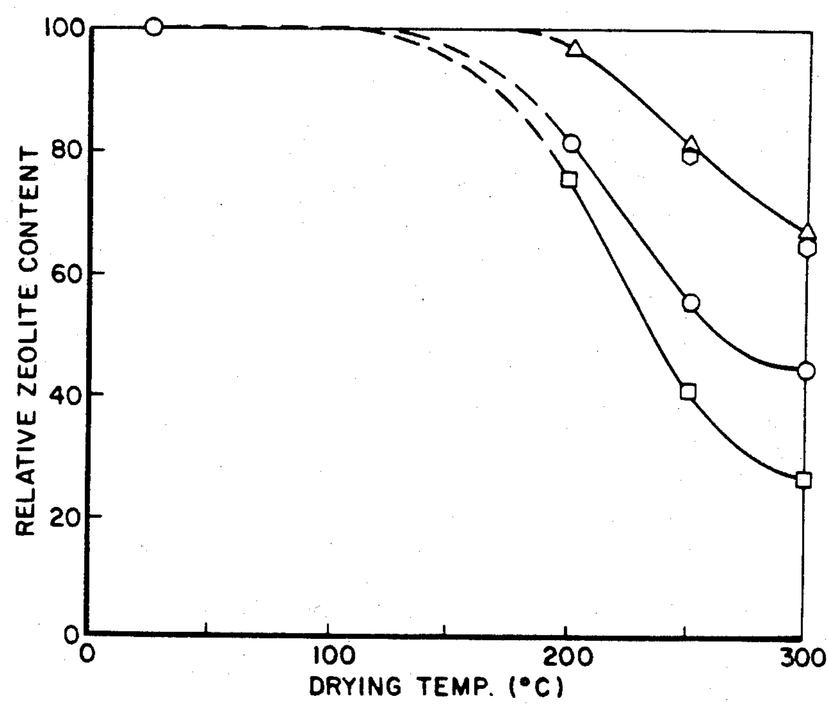
FIG. 4 is a plot of data showing the effect the initial drying temperature has on zeolite content and nitrogen capacity.

FIG. 4 graphically illustrates the data of the relative change in the nitrogen capacity and zeolite content for NaX and CaX dried in a deep bed configuration without purge; see Example 32 and Controls 33–39. The relative change shown in the ordinate is either the nitrogen capacity or zeolite content for a given control referenced to the corresponding value for the CaX or NaX for Example 32 and Control 33. As seen in FIG. 4, drying temperatures less than about 150° C. do not substantially alter the observed nitrogen capacity after subsequent proper activation nor the zeolite content initially present in the adsorbent composition. For drying temperatures above about 150° C. as shown in FIG. 4, NaX reduction in zeolite content and nitrogen capacity are substantially the same within experimental error and are considerably less than that obtained for the calcium form. Further, the calcium form has substantially lower nitrogen capacities than can be accounted for solely by the loss in apparent zeolite content as measured by oxygen adsorbtion.

Apparently an appreciable quantity of the pore volume of the zeolite becomes inaccessible to adsorbates of interest after drying at temperatures between 200° and 300° C.; whereas, the zeolite content determined by accepted X-ray methods fails to give a quantitative indication of this effect. The X-ray and adsorption methods for apparent zeolite content are in excellent agreement for NaX or CaX zeolite which have not been altered by thermal heating at temperatures above 200° C.; see Table VII above. Yet for CaX that has been exposed to temperatures in excess of 200° C., there is a significant departure in the zeolite contents determined by the two methods; compare the results of Examples 27–29 with that of Control 31 in Table VII above and Example 32 with Control 43 in Table VIII below. This difference may help explain why previous workers, if they used X-ray methods routinely to characterize the zeolite, did not discover the high nitrogen capacities associated with CaX.

TABLE VIII

COMPARISON OF STRUCTURAL STABILITY AND $N_2$ CAPACITY FOR CaX and NaX ZEOLITES

| Example | Control | Cation Form | Temperature of Drying (°C.) | $N_2$ Capacity @ 30° atm (mmole/g) | $N_2$ Capacity % Decrease | Zeolite Content[a] XRD (%) | Zeolite Content[a] XRD % Decrease | Zeolite Content[a] Oxygen Adsorption (g/100 g) | Oxygen Adsorption % Zeolite | Oxygen Adsorption % Decrease |
|---|---|---|---|---|---|---|---|---|---|---|
| — | 33 | Na | ambient | 0.26 | 0 | 68 | 0 | 20.9 | 69 | 0 |
| 32 | — | Ca | ambient | 0.75 | 0 | 73 | 0 | 25.6 | 75 | 0 |
| — | 34 | Na | 200 | 0.28 | 7 | NA | NA | 20.1 | 66 | 4 |
| — | 35 | Ca | 200 | 0.51 | 32 | NA | NA | 20.9 | 62 | 18 |
| — | 36 | Na | 250 | 0.22 | 15 | 66 | 3 | 17.2 | 57 | 18 |
| — | 37 | Ca | 250 | 0.28 | 63 | 61 | 16 | 14.1 | 42 | 45 |
| — | 38 | Na | 300 | 0.18 | 31 | NA | NA | 14.0 | 46 | 33 |
| — | 39 | Ca | 300 | 0.18 | 76 | NA | NA | 11.6 | 34 | 55 |
| — | 40 | Na | 250[b] | 0.24 | 8 | NA | NA | 18.9 | 63 | 8 |
| — | 41 | Ca | 250[b] | 0.42 | 44 | NA | NA | 20.3 | 60 | 26 |
| — | 42 | Na | 250[c] | 0.23 | 11 | 66 | 3 | 18.1 | 60 | 13 |
| — | 43 | Ca | 250[c] | 0.30 | 60 | 62 | 15 | 16.0 | 47 | 38 |

[a]Relative to Linde binderless X powder in appropriate ion form.
[b]Shallow bed drying.
[c]Deep bed drying with $N_2$ purge.

EXAMPLE 34 AND CONTROL 44

Another more rigorously controlled comparison drying study was performed under a constant 300 torr (0.39 atm.) water pressure performed using samples of CaX (Example 34) and NaX (Control 44) which were saturated with water similar to the samples used for Examples 32 and Controls 33–43. Forty gram quantities of these Na and Ca samples were placed in a 250 cc round bottom flask equipped with stopcocks and connected to a vacuum manifold. A 250 cc flask containing distilled water was also linked to the manifold and maintained at 75° to 80° C. where the vapor pressure of water approximately equals 300 torr. The manifold was maintained at about 100° C. so that the flask containing the water would control the total pressure of water in the system. Prior to exposure of the zeolite samples, the manifold was evacuated to about $10^{-4}$ mm Hg. The system was then isolated from the vacuum pump and the samples heated to 250° C. and held there for four hours during which time the total pressure and water pressure over the zeolites was defined by the temperature of the water in the reservoir flask and fluctuated between 289 (0.38 atm.) and 355 torr (0.47 atm.) The CaX and NaX samples treated in the manner described above were subjected to the GC evaluation set forth in Example 1. The resulting Henry's law slope for nitrogen indicates that the CaX sample lost about 70% of its initial nitrogen capacity while the corresponding NaX only lost about 10%.

The comparison between the estimated $N_2$ capacities obtained in Example 34 and of Control 44 again demonstrates that, under very controlled conditions, there is a substantial difference in the stability between CaX and NaX.

EXAMPLE 35

The adsorbent prepared in accordance with the procedures of Example 1 was evaluated using the gas chromatographic method previously described. The only difference being that the activation was carried out using dry air (dew point of −52° C.) instead of helium. Using this procedure a selectivity at 30° C. of 12.9 was achieved. This value is well within the experimental error of the measurement and not significantly different from the 13.1 value obtained for the same adsorbent activated under helium flow. The above example shows that dry air can be used to activate the adsorbents and suggests that any nonreactive dry gas can be used for the thermal activation step.

The data set forth above based on the zeolite content measurements have shown that any time the CaX is exposed to appreciable quantities of water vapor at high temperature a reduction in accessible micropore volume; i.e., apparent zeolite content, was observed. It is believed that the protons produced from the hydrolysis of water by the calcium ion during the drying and thermal activation procedures, at conditions where NaX zeolite is stable, attack the zeolitic framework producing hydroxylated silicon and aluminum atoms resulting in the destruction of some of the zeolite. It is also believed that alternative pathways to dehydroxylation of polyvalent cations and more particularly the divalent cations such as calcium, magnesium, strontium and barium, become more accessible with an increase in the initial concentration of the hydroxylated cation species due to concomitant formation of a larger number of protons. Finally, it is believed that the previous scientists and other workers in the field did not recognize the foregoing phenomenon and the fact that the drying and thermal activation must be done in the manner herein described so as to promote dehydroxylation of the divalent ion exchanged faujasites by using higher temperatures while at the same time carefully controlling the attainment of these higher temperatures so as to eliminate or minimize damage to the framework structure which is induced by cation hydrolysis of water.

EXAMPLES 36-39 AND CONTROLS 45-48

A 0.5 kg. sample of 8-12 mesh beads of 13X (NaX) zeolite, obtained from Davison Division of W. R. Grace, was exchanged with one liter of 1M $CaCl_2$.$2H_2O$. The 1M $CaCl_2.2H_2O$ was added slowly to the zeolite contained in a 2-liter round bottom flask equipped with a condenser and thermometer. The solution was brought to 90° to 95° C. over a 30-minute period and held there for an additional hour. The exchange solution was removed, and the beads of 13X were washed three times with approximately one liter of distilled water for each wash. After washing, the beads were allowed to soak in distilled water for approximately 15 minutes to ensure that the zeolite was completely free of any excess $CaCl_2$ solution. After the three washes, a fresh 1-liter portion of 1M $CaCl_2.2H_2O$ was added to the zeolite beads, and the flask was again brought to 95° C. These exchange and wash procedures were repeated three additional times for a total of four exchanges. After the final washes, the resulting highly calcium exchanged zeolite adsorbent was placed in a flat pan and dried with a current of dry nitrogen at ambient temperature. Elemental analysis showed that 98% of the ion exchange capacity had been converted to the calcium form.

Different 50 g. portions of the CaX adsorbent prepared above were subjected to various drying procedures which resulted in a loss of $N_2$ capacity since the water vapor produced from dehydration was not removed efficiently. The nitrogen capacity and zeolite content measured by cryogenic oxygen adsorption, and the deuterium exchanges were determined for each of the treated adsorbents and for the sample which was dried only under $N_2$ at ambient temperature.

Using equation III above, the CA Index was calculated for each of the adsorbents.

Table IX below lists the values of the CA Index, its reciprocal, the $N_2$ capacity, and the ratio of this capacity to that of the control sample (corrected for any loss is micropore accessibility) for each of the adsorbents. These samples provide sufficient data to develop a useful calibration curve that can be used to indicate the relative state of an $N_2$ selective faujasitic adsorbent. The data points represented by circles in FIG. 5 display the dependence of 1/CA on the relative state of the degraded CaX adsorbents described above as defined by the nitrogen capacity of the adsorbent corrected by any reduction in micropore accessibility and normalized by the adsorbent's $N_2$ capacity receiving no thermal treatment prior to proper activation $(n/n_b)(z/z_b)$. Any point along the curve other than $(n/n_b)(z/z_b)=1$ reflects a departure from ideal pretreatment or activation procedures. FIG. 5 shows that adsorbents having a CA Index less than 50 have lost at least 40% of their intrinsic $N_2$ capacity if not properly dehydrated.

TABLE IX

Date for CA Index Calibration Curve[a]

| Example | Control | Thermal Treatment[b] | $N_{Al}$ | CA Index | $\frac{1}{CA}$ | $N_2$ Capacity 30° C., 1 atm | $(n/n_b)(z/z_b)$ |
|---|---|---|---|---|---|---|---|
| 36 | | None | 86.1 | 106 | 0.0094 | 0.84 | 1.0 |
| | | | | 100 | 0.010 | 0.83 | 0.988 |
| 37 | | 400° C., flow activation[c] | 86.1 | 83 | 0.012 | 0.82 | 0.962 |
| 38 | | 150° C. (flat bed) | 81.7 | 73 | 0.014 | 0.81 | 0.935 |
| | | | | 68 | 0.015 | 0.80 | 0.922 |
| | 45 | 300° C. (flat bed) | 85.3 | 48 | 0.021 | 0.55 | 0.555 |
| | | | | 45 | 0.022 | 0.52 | 0.508 |
| | 46 | 250° C. (held under | 86.1 | 41 | 0.024 | 0.44 | 0.405 |

TABLE IX-continued

| Example | Control | Thermal Treatment[b] | $N_{Al}$ | CA Index | 1/CA | $N_2$ Capacity 30° C., 1 atm | $(n/n_b)$ $(z/z_b)$ |
|---|---|---|---|---|---|---|---|
| | | Date for CA Index Calibration Curve[a] | | | | | |
| | | 200 torr water) | | | | | |
| | 47 | 400° C., flow activation[d] | 85.7 | 38 | 0.026 | 0.43 | 0.472 |
| | 48 | 200° C. (flat bed) | 73.6 | 27 | 0.037 | 0.40 | 0.291 |
| | 49 | 250° C. (deep bed) | 69.6 | 16 | 0.063 | 0.25 | 0.122 |
| | | | | 17 | 0.059 | 0.24 | 0.115 |

[a]8-12 mesh 98% Ca exchanged X zeolite (69% X, 2% A) from Davison was used from this study.
[b]prior to careful activation to 400° C. under $10^{-5}$ mm Hg
[c]2° C./min. to 400° C. with a dry $N_2$ purge; residence time = 1.4 sec.
[d]3° C./min. to 400° C. with a dry $N_2$ purge; residence time = 27 sec.

Comparison of Examples 36 and 37 and Controls 46 and 47 to Controls 48 and 49 show that the CA Index accounts for any variation in zeolitic silicon to aluminum ratio.

Additional Examples and Controls below show that the calibration curve has general utility for faujasitic adsorbents and is independent of the amount of zeolitic phase originally present, the zeolitic Si/Al ratio of the active phase, the variations in cation form, exchange level, and the inclusion of A zeolite as a minor phase.

EXAMPLES 40-42, CONTROLS 49-50

The adsorbents designated A, C and D in Table X below were prepared using standard ion exchange processes from commercially available sodium X zeolite beads using procedures similar to those described in Example 36. Adsorbent B in Table X was received predominantly in the calcium form then further calcium exchanged (designated B') using the standard procedures.

The reciprocals of CA for the adsorbents listed in Table X below are represented on the curve in FIG. 5 by diamonds. It can be easily seen that all the adsorbents fall on the curve and that thermal activation with insufficient $N_2$ purge to remove water vapor results in a substantially lower CA Index. (Compare Example 40 to Control 49). Comparison of Example 41 to Controls 49 and 50 shows that an adsorbent containing a significant but minor A zeolite component does not deviate from the generalized calibration curve. Varying both the cation exchange level and Z zeolite content still gives CA values which fall on the calibration curve in FIG. 5 (compare Example 41 to 40). Note that adsorbents containing a zeolite fall on the curve (compare Controls 49 and 50). Comparison of Examples 42 and 41 show that the CA Index adequately accounts for variation in cation form.

TABLE X

| Example | Control | Zeolitic Phases Present in Original | Adsorbent Designation | Ion Form | Exchange Level | Thermal Treatment | CA Index |
|---|---|---|---|---|---|---|---|
| | | Generality of CA Index Calibration Curve | | | | | |
| 39 | | 65% X, 8% A | D | Ca | 95 | 120° C., (deep bed) | 58 |
| | 49 | 69% X, 2% A | A | Ca | 98 | flow activation[a] to 400° C. | 38 |
| | 50 | 52% X, 20% A | B' | Ca | 95 | Flow activation[a] to 400° C. | 42 |
| 40 | | 52% X, 20% A | B | Ca | 80 | none | 103 |
| 41 | | 69% X, 2% A | A | Ca | 98 | none | 106 |
| 42 | | 58% X, 8% A | C | Sr | 98 | none | 111 |

[a]3° C./min. to 400° C. with a dry $N_2$ purge; residence time = 27 sec.

What is claimed is:

1. In a process for the adsorption of nitrogen from nitrogen-containing gases, the improvement which comprises contacting said nitrogen-containing gases with a polyvalent cation exchanged zeolitic adsorbent containing at least 50% by weight faujasite and the faujasite portion thereof having a majority of its exchangeable cations present in the polyvalent cation exchanged form, said adsorbent having been dehydrated in such a manner as to minimize the amount of water in the gaseous environment in contact with said adsorbent during this dehydration step to a partial pressure of water of less than about 0.4 atmospheres at temperatures above 150° up to about 650° C. thereby resulting in a preponderance of its polyvalent ions in a dehydrated/dehydroxylated state.

2. The process of claim 1 for the separation of air into nitrogen and oxygen.

3. The process of claim 1 for the adsorption of nitrogen from a mixture of gases containing nitrogen.

4. The process of claim 1 wherein said faujasite has a silicon to aluminum ratio in the range of approximately 1 up to about 2.

5. The process of claim 1 wherein said faujasite is an X-type.

6. The process of claim 1 wherein said adsorbent contains at least 75% by weight of an X-type of faujasite and the balance is an adsorbent selected from the group consisting of an A-type of zeolite, an inert clay binder, other inert solid materials and mixtures thereof.

7. The process of claim 6 wherein said polyvalent cations are calcium ions.

8. The process of claim 1 wherein said polyvalent cations are divalent.

9. The process of claim 1 wherein said polyvalent cations are selected from a group consisting of magnesium, calcium, strontium, barium, and mixtures thereof.

10. The process of claim 1 wherein said polyvalent cations are calcium ions.

* * * * *